US010846885B2

(12) United States Patent
Torma (10) Patent No.: US 10,846,885 B2
(45) Date of Patent: Nov. 24, 2020

(54) METHODS AND COMPUTER PROGRAM PRODUCTS FOR CALIBRATING STEREO IMAGING SYSTEMS BY USING A PLANAR MIRROR

(71) Applicant: LATERAL REALITY KFT., Budapest (HU)

(72) Inventor: Péter Torma, Zsámbék (HU)

(73) Assignee: LATERAL REALITY KFT., Budapest (HU)

( * ) Notice: Subject to any disclaimer, the term of this patent is extended or adjusted under 35 U.S.C. 154(b) by 147 days.

(21) Appl. No.: 16/082,573

(22) PCT Filed: Mar. 7, 2017

(86) PCT No.: PCT/HU2017/050006
§ 371 (c)(1),
(2) Date: Sep. 6, 2018

(87) PCT Pub. No.: WO2017/153793
PCT Pub. Date: Sep. 14, 2017

(65) Prior Publication Data
US 2019/0043221 A1 Feb. 7, 2019

(30) Foreign Application Priority Data
Mar. 7, 2016 (EP) .................................... 16462003

(51) Int. Cl.
*G06T 7/80* (2017.01)
*G06T 7/593* (2017.01)
(Continued)

(52) U.S. Cl.
CPC ................ *G06T 7/85* (2017.01); *G06T 7/593* (2017.01); *G06T 7/60* (2013.01); *G06T 7/70* (2017.01);
(Continued)

(58) Field of Classification Search
CPC .. H04N 13/239; H04N 13/204; H04N 13/246; H04N 13/211; H04N 13/236;
(Continued)

(56) References Cited

U.S. PATENT DOCUMENTS 8,189,100 B2 * 5/2012 Li ........................... H04N 5/225
348/376
9,930,320 B2 * 3/2018 Chen .................... H04N 13/239
(Continued)

FOREIGN PATENT DOCUMENTS

EP 2866446 A1 4/2015
EP 2866466 A1 4/2015

OTHER PUBLICATIONS

Delaunoy et al., "Two Cameras and a Screen: How to Calibrate Mobile Devices?", Second International Conference on 3D Vision, Tokyo, IEEE Computer Society, 2014, pp. 123-130.
(Continued)

*Primary Examiner* — Margaret G Mastrodonato
(74) *Attorney, Agent, or Firm* — Flaster Greenberg P.C.

(57) ABSTRACT

Production of calibrated stereo images and more particularly methods of producing calibrated stereo images by using a planar mirror and computer program products to carry out the methods. By using mirrored view(s) of at least one camera with multiple (different) mirrored views of an object in one or more captured images, the 3D coordinates of a point in real space with respect to the mirror's coordinate system can be easily determined even if the mirror's coordinate system is not known in advance. Additionally, the real distance between two selected spatial points appearing in one or more captured images can be determined on the basis of their corresponding image points. The invention includes the steps of finding a reference coordinate system by using the captured images, and then determining the transformations between the reference coordinate system and the
(Continued)

camera coordinate system, as described in greater detail herein.

20 Claims, 9 Drawing Sheets

(51) Int. Cl.
| | | |
|---|---|---|
| H04N 13/211 | (2018.01) | |
| H04N 13/246 | (2018.01) | |
| H04N 13/236 | (2018.01) | |
| H04N 13/282 | (2018.01) | |
| G06T 7/60 | (2017.01) | |
| G06T 15/08 | (2011.01) | |
| G06T 7/70 | (2017.01) | |

(52) U.S. Cl.
CPC ........... *G06T 15/08* (2013.01); *H04N 13/211* (2018.05); *H04N 13/236* (2018.05); *H04N 13/246* (2018.05); *H04N 13/282* (2018.05); *G06T 2207/10012* (2013.01); *G06T 2207/10021* (2013.01); *G06T 2207/10028* (2013.01); *G06T 2207/30244* (2013.01)

(58) Field of Classification Search
CPC .................. H04N 13/282; G06T 7/593; G06T 2207/10012; G06T 15/08; G06T 2207/10021; G06T 2207/10028; G06T 2207/30244; G06T 7/60; G06T 7/70; G06T 7/85
See application file for complete search history.

(56) References Cited

U.S. PATENT DOCUMENTS

| | | | | |
|---|---|---|---|---|
| 2011/0001793 A1* | 1/2011 | Moriyama | ........... | H04N 13/398 348/46 |
| 2011/0007205 A1* | 1/2011 | Lee | ...................... | H04N 5/2252 348/369 |
| 2012/0026298 A1* | 2/2012 | Filo | ........................ | G03B 35/10 348/49 |
| 2012/0098938 A1* | 4/2012 | Jin | ........................ | H04N 13/239 348/47 |
| 2012/0320152 A1* | 12/2012 | Seok | ..................... | H04N 13/261 348/42 |
| 2013/0044190 A1 | 2/2013 | Hu et al. | | |
| 2013/0135445 A1* | 5/2013 | Dahi | ................... | H04N 5/23254 348/47 |
| 2014/0198976 A1* | 7/2014 | Coffman | ............ | G06K 9/00201 382/154 |
| 2014/0307101 A1* | 10/2014 | Cobb | ........................ | H04N 5/45 348/169 |
| 2015/0103146 A1* | 4/2015 | Rose | ..................... | H04N 13/239 348/47 |
| 2015/0116463 A1 | 4/2015 | Torma | | |
| 2015/0281674 A1* | 10/2015 | Sato | ..................... | H04N 13/207 348/49 |
| 2016/0140713 A1 | 5/2016 | Martin | | |
| 2017/0256042 A1 | 9/2017 | Torma | | |

OTHER PUBLICATIONS

Gluckman et al., "Catadioptric Stereo Using Planar Mirrors", International Journal of Computer Vision, vol. 44, No. 1, 2001, pp. 64-79.

Hu et al., "Multiple-view 3-D Reconstruction Using a Mirror", The University of Rochester Computer Science Department Rochester, New York, May 2005, 14 pages.

Hu, Bo, "It's All Done with Mirrors: Calibration-and-Correspondence-Free 3D Reconstruction", IEEE Canadian Conference on Computer and Robot Vision, May 25-27, 2009, pp. 148-154.

Kumar et al., "Simple Calibration of Non-Overlapping Cameras with a Mirror", IEEE Conference on Computer Vision and Pattern Recognition, Jun. 23-28, 2008, 7 pages.

Yu et al., "Real-Time Camera Pose Estimation Based on Multiple Planar Markers", Fifth International Conference on Image and Graphics, 2009.

Zhang et al., 3D Reconstruction from a Single View of an Object and its Image in a Plane Mirror, Proceedings. Fourteenth International Conference on Pattern Recognition (Cat. No. 98EX170), vol. 2, Aug. 16, 1998, pp. 1174-1176.

* cited by examiner

METHODS AND COMPUTER PROGRAM PRODUCTS FOR CALIBRATING STEREO IMAGING SYSTEMS BY USING A PLANAR MIRROR

This is the national stage of International Application PCT/HU2017/050006, filed Mar. 7, 2017.

FIELD OF THE INVENTION

The invention generally relates to the production of calibrated stereo images. More particularly, the present invention relates to methods of producing calibrated stereo images by using a planar mirror and computer program products to carry out the methods.

BACKGROUND OF THE INVENTION

The distance between a camera and a spatial point in a scene can be determined or well estimated from the position of the point within two or more associated images showing the same point, wherein either the scene is stationary or the associated images are captured simultaneously. The distance calculation is still possible if one or more planar mirrors are arranged in the scene, and some of the images are captured in the mirror. The three dimensional (3D) position of a point can be computed from basic geometric relationships when the relationship between the spatial position of the image recording device and the spatial position and specific parameters of the reflecting surfaces (e.g. mirrors) are known. The challenge in computing an unknown distance from multiple images using reflecting surfaces is called catadioptric stereo vision. In J. Gluckman and S. K. Nayar: Catadioptric Stereo Using Planar Mirrors (International Journal on Computer Vision, 44(1), pp. 65-79, August 2001), the basic theory of catadioptric stereo image generation is described in detail. In this paper an image-capturing setup including one camera and one planar mirror is introduced with a known relative position of the camera and the mirror, and hence calibration is not needed This method results in a volumetric 3D representation of an object in the real camera's view.

In the paper of Hu et al. 'Multiple-view 3-D Reconstruction Using a Mirror' (ftp://ftp.cs.rochester.edu/pub/papers/robotics/05.tr863.Multiple-view_3-d_reconstruction_using_a_mirror.pdf) a stationary camera and a planar mirror are used for multiple-view three dimensional object reconstruction. The distance between the mirror and the camera is obtained by a single object point and a pair of points of the mirrored view of the object. The mirror image of the camera is searched in the captured images and then the epipoles of the virtual camera are used to determine the spatial relationship between the virtual camera and the real camera. This method, however, cannot be used for 3D object reconstruction if the real object is not visible in the captured images.

The paper of Kumar et al., 'Simple calibration of non-overlapping cameras with a mirror' (http://frahm.web.unc.edu/files/2014/01/Simple-Calibration-of-Non-overlapping-Cameras-with-a-Mirror.pdf), introduces a calibration method for set of cameras. Although this method also uses the mirror images of the cameras, it does not use the images of the real object, and therefore at least five images are required in order to recover the real camera position and orientation.

Calibrating a stereo (or multi-view) camera system is a complicated task. In general, it requires to find several corresponding points in the captured images, and then to solve a non-linear optimization problem with six to eight parameters (depending on whether or not the focal lengths of the cameras are known). In our proposed methods, calibration can be obtained by reducing the aforementioned optimization problem to two independent, much simpler optimization problems, each having three or four parameters (depending on whether or not the focal lengths are known). Due to this decomposition of one complicated computation into two simpler computations, the methods of the invention are faster, more reliable and more robust than the known calibration methods.

The document EP 2866466 is regarded as the closes prior art. This document discloses a multi-camera setup including a mirror for producing calibrated stereo images. In this solution it is assumed that the transformations between the coordinate systems of the different cameras are known and only one of the cameras is facing the mirror. The primary camera, which faces the mirror, captures an image that shows also the camera itself. The position of this primary camera in the captured image is then used to determine the real position of the primary camera. Once the real position of the primary camera is determined, the known coordinate transformations between the primary camera and the other cameras can be carried out. In this setup the images are captured with stationary cameras. This solution has the following deficiencies among others:

for the stereo image generation and the system's calibration process, it requires at least two cameras, one of which is facing a mirror and observing a mirrored view of the object and a mirrored view of the camera itself, and the coordinate transformations between each pair of cameras shall be known in advance.

It is an object of the present invention to provide an improved method for calibrating a stereo imaging system, which at least partly eliminates the deficiencies of the known calibration processes.

The core idea of the calibration methods of the present invention is that by using the mirrored view(s) of the at least one camera along with multiple (different) mirrored views of an object in one or more captured images, the 3D coordinates of a point in the real space with respect to the mirror's coordinate system can be easily determined even if the mirror's coordinate system is not known in advance. Additionally, by selecting two spatial points which both appear in one or more captured images, the real distance between the two selected points can be determined on the basis of their corresponding image points.

These and other objects are achieved by providing the methods according to the present invention.

The key features of the calibration methods according to the invention include the steps of finding a reference coordinate system by using the captured images, and then determining the transformations between the reference coordinate system and the camera coordinate systems. The reference coordinate system is selected so that its origo and two axes reside in the mirror's plane with one of said two axes being vertical. Due to the mirrored view of the camera shown in an image captured by itself, the mirror's plane can be easily determined from a single image showing the camera. Using the camera's gravity sensor, the vertical direction can be defined in the mirror's plane, thus obtaining the vertical axis y of a mirror coordinate system. Hence, an appropriately oriented mirror coordinate system can be obtained for each image. The transformations between the reference coordinate system and the mirror coordinate systems (determined from different images) can then be easily calculated from any image pair. In the first calibration method of the invention, the origo of the reference coordinate system is selected arbitrarily in the mirror's plane (it may be the origo of any mirror coordinate system or any user-selected point on the mirror itself). In the second calibration method of the invention, wherein a single camera is used, the reference point is the epipole of the stereo image.

SUMMARY OF THE INVENTION

In a first aspect of the present invention, it is provided a method for calibrating a stereo imaging system by using at least one camera, each carried by a respective camera device, and a planar mirror, the method comprising the steps of:
- obtaining at least two images by means of said at least one camera, each of the images being captured from a different camera position and containing the pictures of a mirrored view of the camera used to capture the image, and a mirrored view of an object, thereby obtaining multiple views of said object,
- finding the center of picture of the mirrored view of the image-capturing camera in each of the images,
- obtaining a focal length in pixels of the at least one camera,
- determining the direction of the mirror's normal vector from the center of the mirrored view of the image-capturing camera,
- determining the distance between the camera and the mirror for each of the images by using (i) a reference point on the camera device, said reference point having known coordinates in the camera coordinate system, and (ii) the coordinates of the corresponding point of the mirrored view of the camera device,
- determining the mirror plane equation in the coordinate system of the at least one camera by using the direction and the distance of the mirror plane's normal and the focal length in pixels of the camera,
- defining an up-vector in the mirror's plane,
- selecting a reference point in the mirror's plane,
- defining a reference coordinate system with said reference point as its origo and said up-vector as its vertical axis y,
- for each image, separately determining the coordinate transformation from the coordinate system of the image-capturing camera into a mirror coordinate system,
- for each image, determining the transformation from the respective mirror coordinate system into said reference coordinate system, and
- for any pair of images, determining the coordinate transformation from the camera coordinate system of the first image-capturing position into the camera coordinate system of the second image-capturing position.

In a second aspect of the present invention, it is provided a method for calibrating a stereo imaging system by using one camera carried by a camera device, and a planar mirror, the method comprising the steps of:
- obtaining one image captured by the camera, said image containing the pictures of a object, a mirrored view of the object and a mirrored view of the camera used to capture the image, thereby obtaining multiple views of the object,
- finding the center of the picture of the mirrored view of the camera in the image,
- obtaining a focal length in pixels of the camera,
- determining the direction of the mirror's normal vector from the center of the mirrored view of the camera,
- determining the distance between the camera and the mirror for each of the images by using (i) a reference point on the camera device, said reference point having known coordinates in the camera coordinate system, and (ii) the coordinates of the corresponding point of the camera device belonging to the same image-capturing camera,
- determining the mirror plane equation in the coordinate system of the camera by using the direction and the distance of the mirror plane's normal vector and the focal length in pixels of the camera,
- determining the coordinate transformation from the coordinate system of the camera into an arbitrary mirror coordinate system having an origo in the mirror's plane and a z-axis parallel to a normal vector of the mirror's plane.

In a third aspect of the invention, it is provided a method of measuring a calibrated distance between two points of an object, wherein the method comprises the steps of:
- capturing at least one image, by means of a camera-mirror setup including a planar mirror and one camera facing the mirror, each captured image showing multiple views of an object,
- calibrating said camera-mirror setup through the steps of the method according to the first or second aspect of the invention,
- selecting an associated point pair of the object in one of the at least one captured image, and
- calculating the real distance between the two points of said selected point pair of the object from the corresponding image pixel pair by using epipolar geometry.

In a fourth aspect of the invention, it is provided a method of calibrated depth estimation for an object, wherein the method comprises the steps of:
- capturing at least one image with multiple views of said object by means of a camera-mirror setup including a planar mirror and at least one camera facing the mirror,
- calibrating said camera-mirror setup through the steps of the method according to the first or second aspect of the invention, and
- generating a depth image of the object from the at least one captured image.

In a fifth aspect of the invention, it is provided a computer program product, which includes computer-readable instructions that, when running on a computer, carry out the steps of the method according to the first aspect of the present invention.

In a sixth aspect of the invention, it is provided a computer program product, which includes computer-readable instructions that, when running on a computer, carry out the steps of the method according to the second aspect of the present invention.

The methods according to the present invention have the following advantages:
- Only one camera which faces a mirror may be enough for capturing images at different positions. Although in this single-camera setup, the images can be captured successively, it is not necessary to know the coordinate transformations between the camera coordinate systems in the different camera positions in advance as these transformations are calculated during the calibration process. (It is noted that using this setup requires the object to be stationary.)
- Calibration can also be carried out by using two (or even more) cameras simultaneously. (It is noted that in a multiple-camera setup, the object may move.)

The object may also reside between the camera(s) and the mirror.

BRIEF DESCRIPTION OF THE DRAWINGS

The invention will now be described in detail through preferred embodiments with reference to the accompanying drawings wherein.

DETAILED DESCRIPTION OF THE INVENTION

Within the context of the present description, the term "image" means the product of image capturing performed by an image recording device, such as an image sensor or a camera, generally referred to as "camera" hereinafter, and the term "picture" means a visual representation of an object (or person) within a captured image. An image may be a still image or a frame of a video sequence (also referred to as video image). The picture of an object in an image may represent either a normal view of an object or a mirrored view of an object showing in the mirror.

Figure 1:
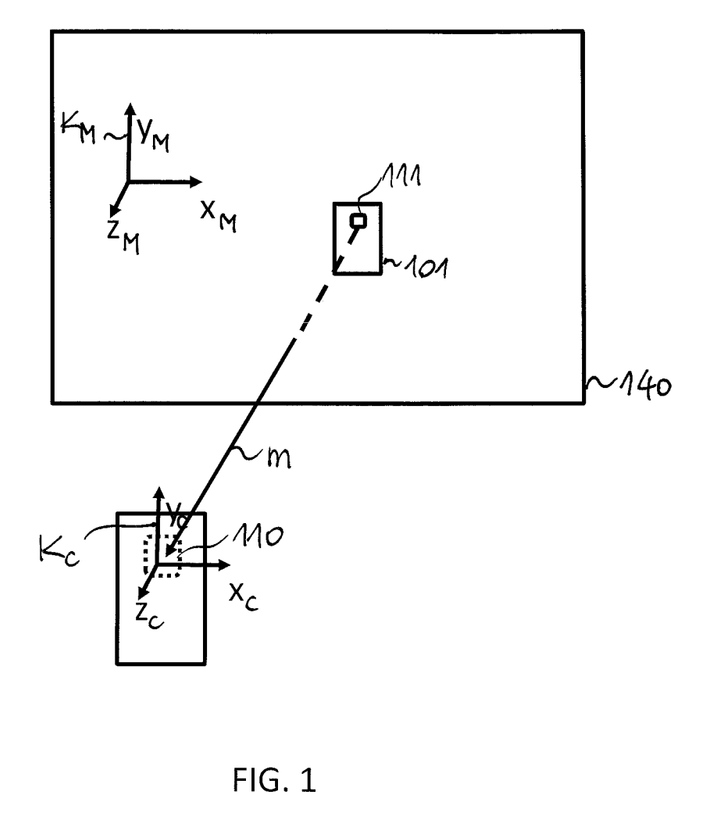
FIG. 1 schematically illustrates the coordinate systems and the geometry of the methods of the present invention.

FIG. 1 illustrates the coordinate systems generally used in the calibration methods of the present invention. A real camera device 100 has a Cartesian coordinate system $K_C$ having mutually orthogonal axes $x_C$, $y_C$ and $z_C$. The real camera device 100 comprises a real camera 110. The real camera device 100 may be any kind of processor-based device equipped with a camera or any sort of image sensor. The camera device 100 may include, for example, a mobile phone, a smart phone, a phablet, a tablet PC, a notebook, a digital camera, or the like, or any kind of other camera device capable for capturing an image.

A planar mirror 140 also has a Cartesian coordinate system $K_M$ having mutually orthogonal axes $x_M$, $y_M$ and $z_M$, wherein the axes $x_M$ and $y_M$, and therefore the origo g of the mirror coordinate system $K_M$ are all in the plane of the mirror 140. The real camera device 100 has a mirrored view, a so-called virtual camera device 101 appearing behind the mirror. The virtual camera device 101 also has a virtual camera 111, which is a mirrored view of the real camera 110.

A vector m is defined to be perpendicular to the mirror 140 and to have a length which is equal to the distance between the mirror 140 and the real camera 110. One can calculate the vector m using the point of the mirror 140 where the virtual camera 111 appears in the image that contains the camera's mirrored view as it will be described later.

Figure 2:
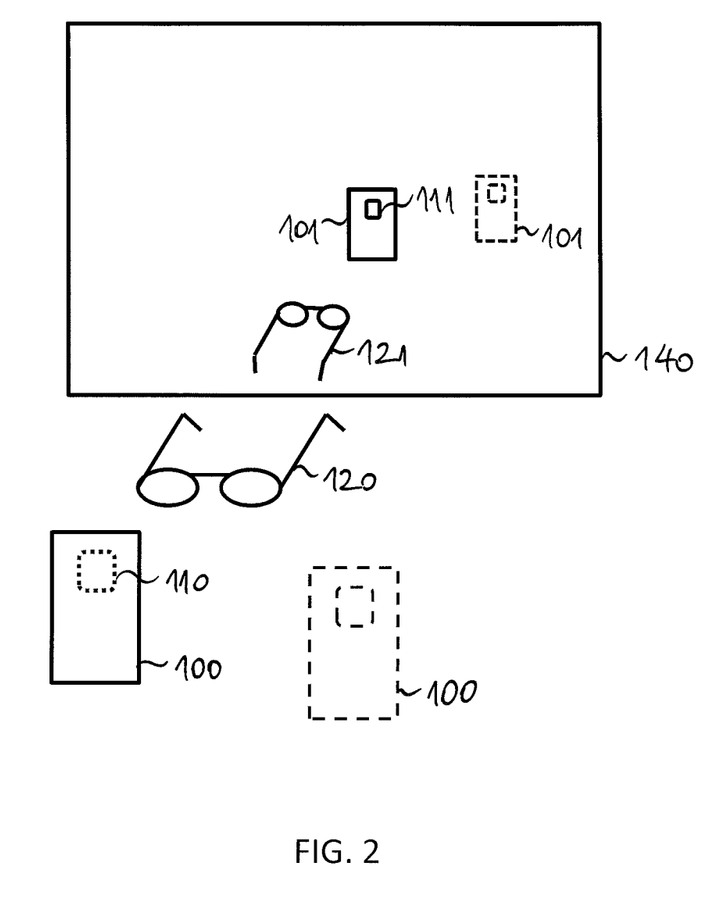
FIG. 2 schematically illustrates the camera-mirror setup according to a first aspect of the present invention.

According to a first aspect of the present invention, the calibration is based on a camera-mirror setup shown in FIG. 2. In this setup the real camera 110 captures multiple (at least two) images, each captured image showing only a mirrored object 121 and the mirrored camera 111. Although the real object 120 can be within the field of view of the real camera 110 partly or entirely, it has no importance regarding the calibration procedure as only the image points of the mirrored objects are processed in the method of the invention according to its first aspect. It means that the real object may either be placed in a space volume between the real camera 100 and the mirror 140, or at a location that is farther from the mirror 140 than from the camera 100. In this latter case, the captured images do not contain the mirrored views of the real object 120 at all.

It is noted that in FIGS. 1 and 2, the real camera device 100 has its camera 110 on its side facing the mirror 140, therefore the real camera 110 is depicted by dotted lines in those Figures.

Figure 3:
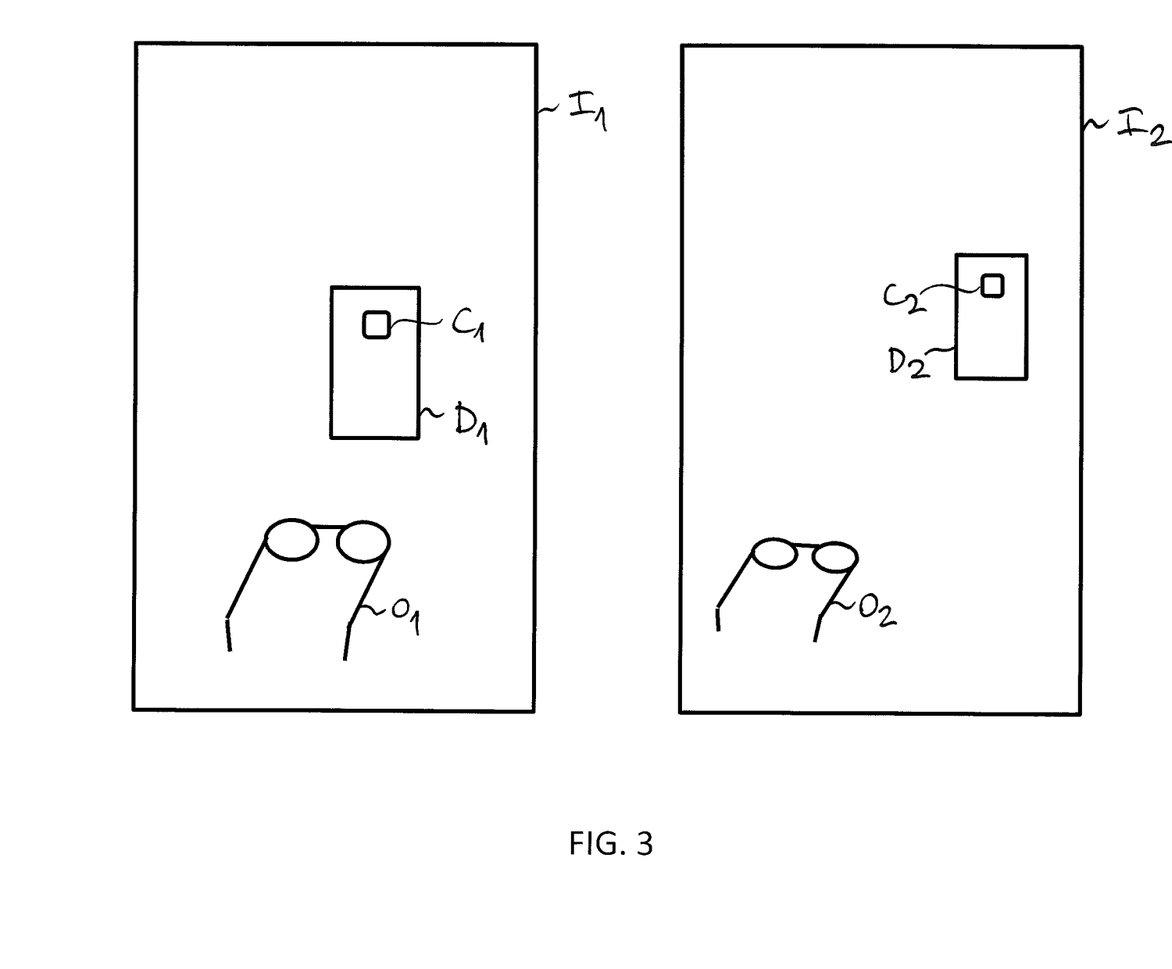
FIG. 3 shows two images captured by a camera at different positions in the camera-mirror setup of FIG. 2.

In FIG. 3, two images I1 and I2 are shown for example, each one being captured at different camera positions. In the images I1 and I2, the mirrored camera device has two pictures D1, D2, respectively, at different positions (i.e. these are the mirrored views of the camera device 100), the mirrored camera has two pictures C1, C2, respectively, at different positions, (i.e. these are the mirrored views of the camera 110), and the mirrored object (i.e. the mirrored view of the real object 120) has also two pictures O1, O2, respectively, also at different positions. In case more than two images are captured, all of the images are preferably captured at different camera positions, while the relative position between the object and the mirror is assumed to be constant. If the images I1 and I2 are captured by two cameras simultaneously, the object does not need to be stationary, as long as the images are captured at the same time.

Figure 4:
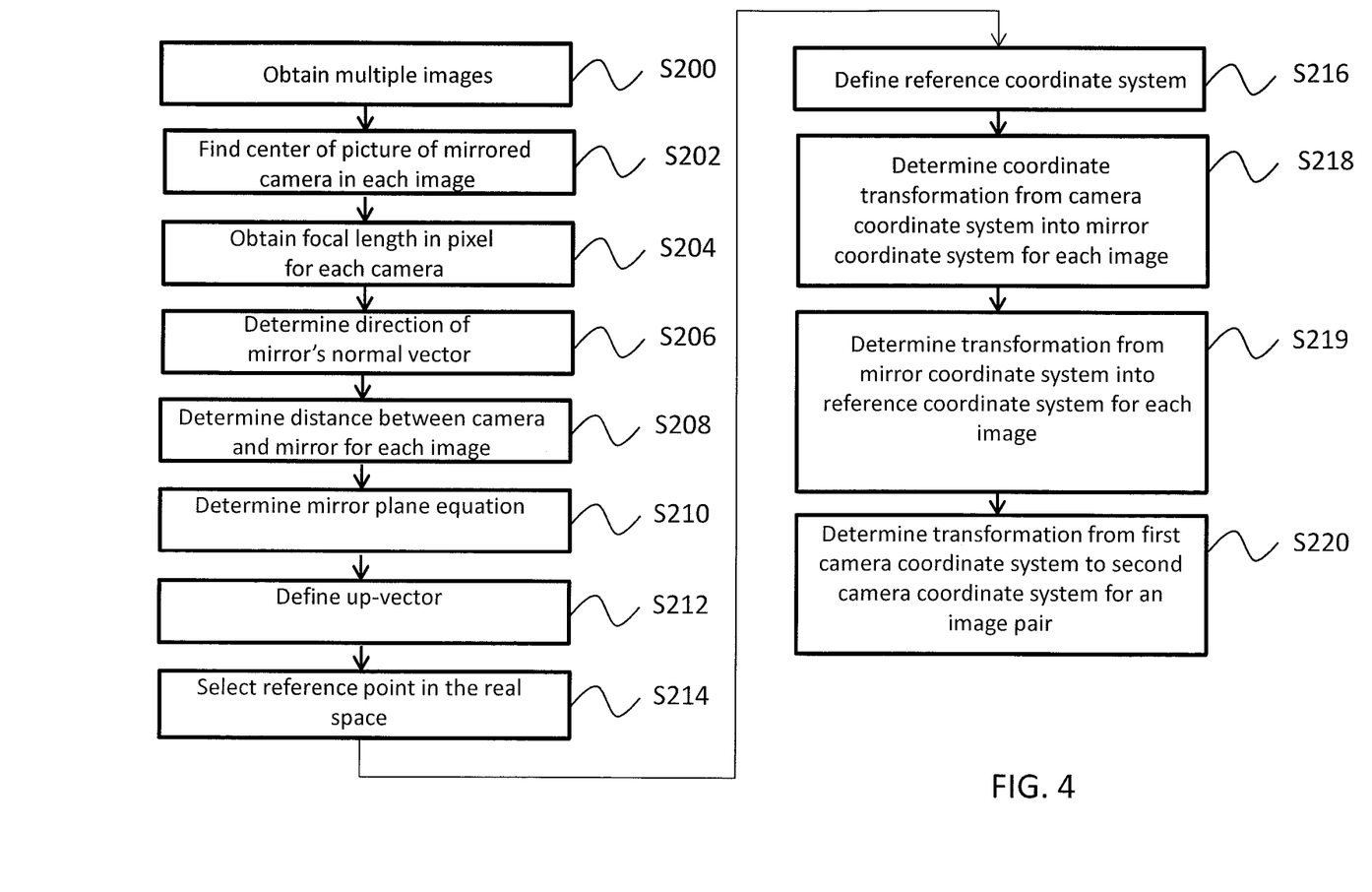
FIG. 4 is a flow diagram of the major steps of the calibration method according to the first aspect of the present invention.

The main steps of the calibration method of the present invention according to its first aspect are shown by the flow diagram of FIG. 4.

In step S200, at least two images are obtained by using the aforementioned camera-mirror setup shown in FIG. 2. Each of the images contains a mirrored view of the image-capturing camera 110 and a mirrored view of an object 120.

The image processing part of the method has the following four phases:

A) Determining a coordinate transformation $M^*_1$ from a first camera coordinate system $K_{C1}$ to an arbitrary mirror coordinate system $K^*_{M1}$ by using a first image, and determining a coordinate transformation $M^*_2$ from a second camera coordinate system $K_{C2}$ to another arbitrary mirror coordinate system $K^*_{M2}$ by using a second image. The mirror coordinate systems $K^*_{M1}$ and $K^*_{M2}$ are selected so that their origo resides in the mirror's plane and their z-axis is parallel to a normal vector of the mirror's plane.

B) Using a freely selected global vector, a so called up-vector that can be detected in relation to all of the initial images, one can define a common y-axis of these mirror coordinate systems $K^*_{M1}$ and $K^*_{M2}$, and hence the transformations $M^{}_1$ and $M^{}_2$ from the first and second camera coordinate systems $K_{C1}$, $K_{C2}$ to the mirror coordinate systems $K^{}_{M1}$ and $K^{}_{M2}$, respectively.

C) Determining a global origo g and finding the coordinates of this origo g in the mirror coordinate systems $K^{}_{M1}$, and $K^{}_{M2}$, thereby obtaining a specific mirror coordinate system $K_M$, and then determining the coordinate transformations $M_1$ and $M_2$ from the first and second camera coordinate systems $K_{C1}$, $K_{C2}$, respectively, to the common mirror coordinate system $K_M$, which is used as a reference coordinate system.

D) Determining a coordinate transformation F from any camera coordinate system $K_{Ck}$ to the first camera coordinate system $K_{C1}$ by determining the coordinate transformation $M_k$ with respect to a further image $I_k$, wherein $F=M_k^{-1}M_1$.

The above phases of the calibration method of the present invention will now be described in detail with reference to the flow diagram shown in FIG. 4 and to the setup shown in FIG. 3 illustrating two captured images as an example. It is noted that the images I1 and I2 shown in FIG. 3 may be recorded either by the same camera subsequently, or by different cameras simultaneously. In the latter case, the pictures D1 and D2 belong to different camera devices.

Determination of the Transformation M*

In order to determine a coordinate transformation from a camera coordinate system to an arbitrary mirror coordinate system, the center of the pictures C1, C2 of the mirrored cameras is first to found in each of the images in step S202.

In the calculations we assume that the coordinate transformations have the following general form:

$$M = \begin{pmatrix} R & t \\ 0 \ 0 \ 0 & 1 \end{pmatrix}$$

where M is a complete homogenous transformation matrix, R is a 3×3 rotation matrix, and t is a 3×1 translation vector.

To calculate the rotation matrix R, first the z-axis of the camera is to be transformed to the normal vector n of the mirror plane. The normal vector is $$n = \frac{m}{\|m\|},$$

wherein m is me vector pointing from the mirror to the camera and orthogonal to the mirror's plane. Consequently, $\|m\|$ defines the distance between the mirror and the camera.

The rotation matrix R should transform the y-axis of the camera to the projection of the same global vector to the mirror plane. Hence, it is necessary to define a vector u that is common to all captured images. Based on said vector u, the rotation matrix may be defined as:

$R=(u \times n \ u \ n)$ where u×n stands for cross product of the vectors u and n. The projection of the global vector u* onto the mirror's plane will result in an up-vector u of the mirror coordinate system $K_M$.

In a camera coordinate system, the mirror plane can be formulated as:

$m^T x + \|m\| = 0$ wherein x is any point of the mirror's plane.

Note that there exist numerous possible transformations M* from a particular camera coordinate system to an arbitrary mirror coordinate system $K^*_M$, since the mirror coordinate system is not completely specified at this stage. The only restrictions for the mirror coordinate system are that the third column of the rotation matrix R in the coordinate transformation M* should be $$n = \frac{m}{\|m\|},$$

and the translation vector t of the transformation M* should be a vector pointing from the camera's focal point to any point of the mirror's plane, that is $m^T t + \|m\| = 0$ In step S210, the mirror plane equation is determined. To this end the value of the vector m is to be calculated. This can be done in three steps. First, the direction of the vector m is determined using the value of a so-called "focal length in pixels" acquired in step S204 and then the length of the vector m is determined using a selected point of the camera device, said point having known coordinates in the camera's coordinate system.

The focal length f of the camera may either be a constant value and thus specified by the manufacturer of the camera, or it may be set by the user when capturing the images. In both cases, the focal length f of the camera is therefore assumed to be known. Next, the value of the focal length in pixels H is to be obtained. This may be obtained by the following steps.

Let Q be a point in the (either real or virtual) space and let p denote a respective pixel in the captured image. The pixel coordinates $p_x$, $p_y$ of the point p in the image may be defined in the camera coordinate system by the equations:

$$p_x = Q_x \frac{f}{sQ_z} \quad p_y = Q_y \frac{f}{sQ_z}$$

where f is the focal length of the capturing camera and s is the pixel size of the camera. Generally, the pixel size s is a camera-specific parameter given by the manufacturer of the camera. Its value is typically about 1 micron.

For making the following calculations easier, the parameter "focal length in pixels" H is defined as the ratio of the focal length f and the pixel size s of the camera:

$$H = \frac{f}{s}$$

In the next step S206, the direction n of the mirror's normal vector m will be determined. It can be calculated using the fact that the line between the center of the real camera and the center of the mirrored view of the camera is perpendicular to the mirror's plane. Hence the direction n of the mirror's normal vector m can be calculated as follows:

$$n = \alpha \begin{pmatrix} c_x \\ c_y \\ H \end{pmatrix}$$

wherein $(c_x, c_y)$ are the coordinates of the center of the picture C1, CA of the mirrored camera in the captured image and a is a scalar value that gives a vector of length 1 for n:

$$\alpha = \sqrt{\frac{1}{c_x^2 + c_y^2 + H^2}}$$

For determining the mirror vector m it is still necessary to find its length (i.e. the distance between the mirror and the camera), namely the scalar value of the vector ||m||. This value is called the "aspect ratio" of the camera in the image.

It is easy to calculate said aspect ratio if the camera's plane is parallel to the mirror's plane (i.e. the camera's z-axis is perpendicular to the mirror's plane). In this case it can be calculated using the ratio of the distance between two real points the distance of the corresponding points shown in the image, measured in pixels.

Calculating the distance between the camera and the mirror's plane will be more complicated if the camera is not parallel to the mirror. For doing these calculations it is assumed that there is a point U on the camera device, said point having known coordinates in the camera coordinate system $K_C$ and this point can be detected on the captured image.

Let us define the length of the vector m by the expression m=μn. The coordinates of the mirrored view V of the point U as a function of μ can be calculated as follows:

$$V = U - 2\mu(n^T U + 1)n$$

It is assumed that a projection of V onto the image has been detected. Let us denote this projected point by v. The coordinates of v can be expressed in the following way:

$$v_x = H\frac{V_x}{V_z} = H\frac{U_x - 2\mu(n^T U + 1)n_x}{U_z - 2\mu(n^T U + 1)n_z}$$

$$v_y = H\frac{V_y}{V_z} = H\frac{U_y - 2\mu(n^T U + 1)n_y}{U_z - 2\mu(n^T U + 1)n_z}$$

Any of these equations can be solved to find μ, since they are linear in this single variable. As mentioned before, this leads to finding m=μn.

It is noted that one needs to ensure that the selected point U does not reside in the direction of the vector m, since in this case the projection onto the image will always coincide with the projection of the camera's center and the calculations cannot be carried out.

As a result, the mirror plane equation can be obtained in step S212 according to the above mentioned formula:

$$m^T x + \|m\| = 0$$

Determination of the Transformation M**

Next, in step S212, a specific up-vector u is defined for the mirror coordinate system $K_M$ in the following way.

Let u* be any vector in the space. A possible selection for u* may be the gravity vector which can be obtained from a gravity sensor of the camera device, for example. Another option may be to select two points in the space with known distance from the mirror's plane. In this latter case one need to be able to find the corresponding pixels in the captured images. In fact it is not necessary to actually know this vector u*, it is only needed to know (or to calculate) its projection onto the mirror's plane, which vector is denoted by u. This projected vector u is regarded as a so-called up-vector of the mirror coordinate system. The up-vector allows to define a coordinate transformation M** from the camera coordinate system to the mirror coordinate system in a more determined way, through setting the second column of the rotation matrix R to u. It is noted that at this point the rotation matrix R is entirely defined since the third column is the mirror's normalized normal vector and the first column can be acquired from the principle of orthonormality.

Determination of the Transformation M

In step S216, the origo of the mirror coordinate system $K^{**}_M$ is determined. This can be done in several ways, the most preferred ways of which will be introduced hereinafter. In these schemes the mirror coordinate system will provide a reference coordinate system for subsequent coordinate transformations.

In a first preferred way, the origo of the mirror coordinate system is obtained by freely selecting a point in the space in step S214. To this end, it is assumed that there is a point p at a known distance d from the mirror and this point can be seen in each of the at least one captured images. For example, this point may be selected as a visual mark on the mirror itself. The origo of the mirror coordinate system is considered to be the projection of this point p onto the mirror's plane. Let the image pixel coordinates of the selected point p in the k-th image be $(p_x^k, p_y^k)$, and let its distance from the mirror bed. Let $g^k$ be the base vector of image ray. This means that the point p referring to $(p_x^k, p_y^k)$ can be written as a multiple of $g^k$, wherein $g^k$ can be written using the pixel coordinates and the focal length in pixels of the camera:

$$g^k = \begin{pmatrix} p_x^k \\ p_y^k \\ H \end{pmatrix}$$

The 3D real coordinates $p = \mu g^k$ can be easily calculated in the camera coordinate system by noting that it is the cross point of a multiple of the ray vector and the translation of the mirror plane by d, that is $$m^T x + \|m\| + d = 0.$$

As a result $g^k$ can be calculated by finding a multiplication factor μ for which:

$$\mu m^T \begin{pmatrix} p_x \\ p_y \\ H_2 \end{pmatrix} + \|m\| + d = 0$$

From the above equation the 3D coordinates of point p in the camera coordinate system is:

$$p = -\frac{\|m\| + d}{m^T g^k} g^k$$

The origo of the mirror coordinate system can be obtained by adding a vector of length d and the direction of the mirror plane normal to p, resulting in the following expression:

$$t = p + d\frac{m}{\|m\|}.$$

A second preferred way of determining the origo of the mirror coordinate system is to select an arbitrary point in the mirror plane in step S214 (e.g. the projection of the focal point of the camera), finding the associated image point in one of the captured images, and then finding a few further corresponding points in at least one other captured image. The origo of the mirror coordinate system can then be calculated by means of an optimization method (e.g. least mean square or the generalized Hough transform). It is noted that in this scheme, more than one associated point pairs are needed for the calculations. The optimization problem comes straightforwardly from the above equations. Let us assume that there are some corresponding pixels in the images $(p_{x,i}^k, p_{y,i}^k)$, where the index i denotes the different points, and the index k denotes the different images. Then the 3D of the base vector of the image ray $g^k$ of the a pixel point i in an image k is $$g_i^k = \begin{pmatrix} p_{x,i}^k \\ p_{y,i}^k \\ H \end{pmatrix}$$

It is noted that the distances of these points from the mirror's plane is unknown. Let us denote these distances by $d_k$. This results in the following set of equations:

$$t_k = -\frac{\|m\| + d_k}{m^T g_i^k} g_i^k + d_k \frac{m}{\|m\|}$$

where the coordinates of $t_k$ and $d_k$ are unknown for all points. It is obvious that one corresponding point pair comes with one new unknown $d_k$ and gives a two-dimensional constraint shown above for each image pair. As a result, two corresponding point pairs determine the missing translations ($t_k$) to the common origo of the mirror coordinate system.

Figure 9:
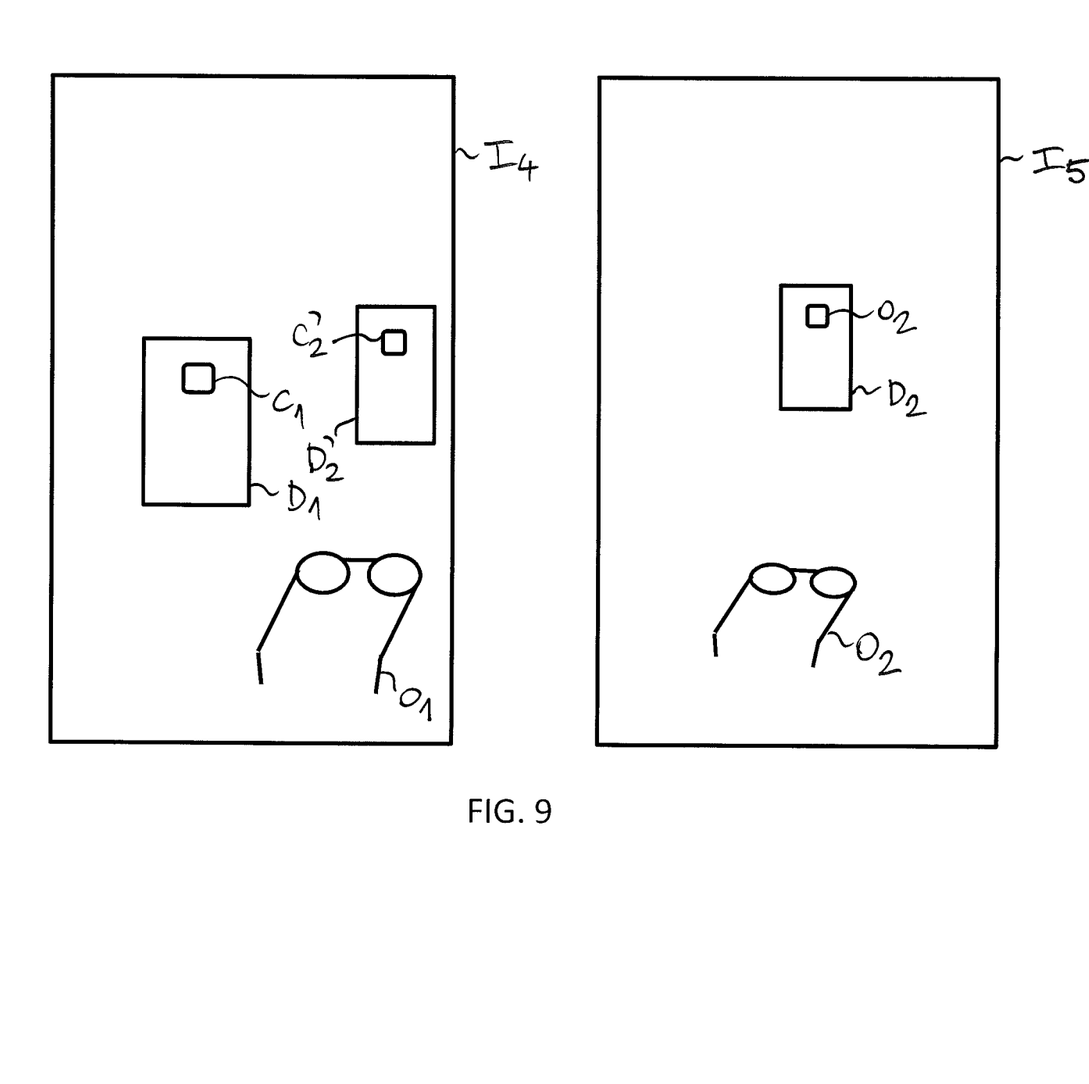
FIG. 9 shows a further pair of exemplary images simultaneously captured by two cameras at different positions in the camera-mirror setup according to the first aspect of the present invention.

A third preferred way of determining the origo of the mirror coordinate system is, as shown in the example of FIGS. 4 and 9, to capture images I4, I5 by using two camera devices simultaneously in such a way that at least one of the images includes the pictures D1, D2' of the mirrored views of both camera devices, while the other image (e.g. image I5) includes only the picture D2 of the mirrored view of the second camera, as shown in FIG. 9. The images I4, I5 also show the pictures O1, O2 of the mirrored view of the object. It is noted that once the mirror plane equation is known in both camera coordinate systems, the distances between the camera devices and the mirror are also known. Furthermore, the projected points of the focal points of the cameras in the images are also known. In the above described scheme the projected focal point of the picture D2 of the second mirrored camera may be the common origo. Since the distance of D2 from the mirror and the pixel position of this point in image I4 is known, the translation to the common origo (the projection of D2 to the mirror plane) can be easily calculated for the first image.

Based on the above calculations and considerations, the coordinate transformation from the coordinate system of the image-capturing camera into a mirror coordinate system is determined for each image (step S218), and then the coordinate transformation from a particular mirror coordinate system into a reference coordinate system is determined for each image (step S219).

Hence, in step S220, a coordinate transformation between any two camera coordinate systems, each belonging to a particular spatial image-capturing position, can be carried out by using the above mentioned fundamental matrix:

$$F_{kn} = M_k^{-1} M_n$$

wherein $M_k$ and $M_n$ are the coordinate transformations from the camera coordinate systems $K_{Ck}$ and $K_{Cn}$, respectively, into the mirror coordinate system $K_M$. The advantage of the above described calibration method is that the coordinate transformation matrices M can be determined for each captured image separately, thus the calculation of the fundamental matrix F requires less computational force than in other known methods.

Figure 5:
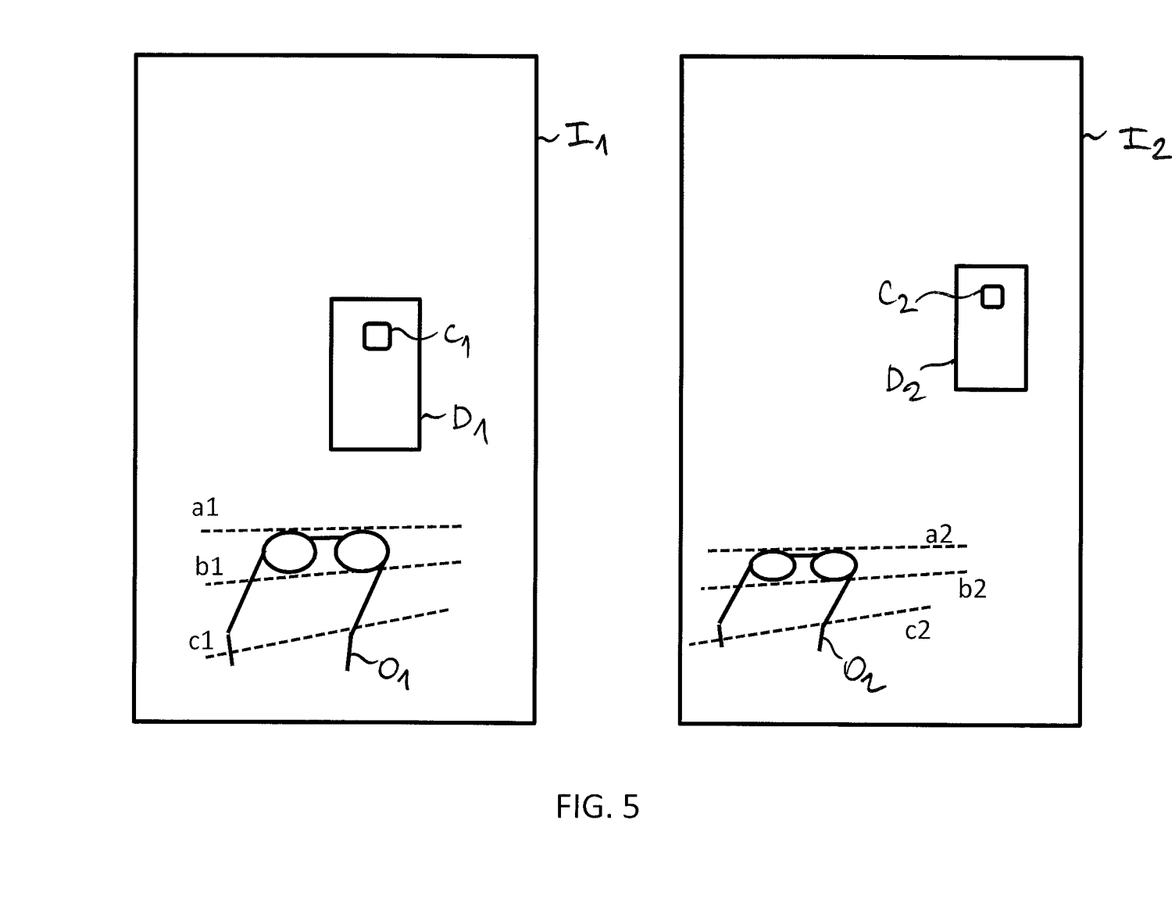
FIG. 5 illustrates the images of FIG. 3 with epipolar lines.

The fundamental matrix F can be visualized by epipolar lines as shown in FIG. 5, in which the dashed lines of images I1 and I2 with the same letter are mutually corresponding epipolar lines. Accordingly, the corresponding epipolar line pairs in image I1 and image I2 are lines a1 and a2, respectively; lines b1 and b2, respectively; and lines c1 and c2, respectively. It means that any point in one of the images I1, I2 should belong to a real 3D point that has its picture on the other one of the images I1, I2 along the corresponding epipolar line (assuming that the mentioned point is not masked in the other images).

In a second aspect of the present invention, multiple views of the object are shown within one image, wherein one of the views of the object is normal view and the other view of the object is a mirrored view thereof. The image shall also contain the mirrored view of the image-capturing camera itself.

Figure 6:
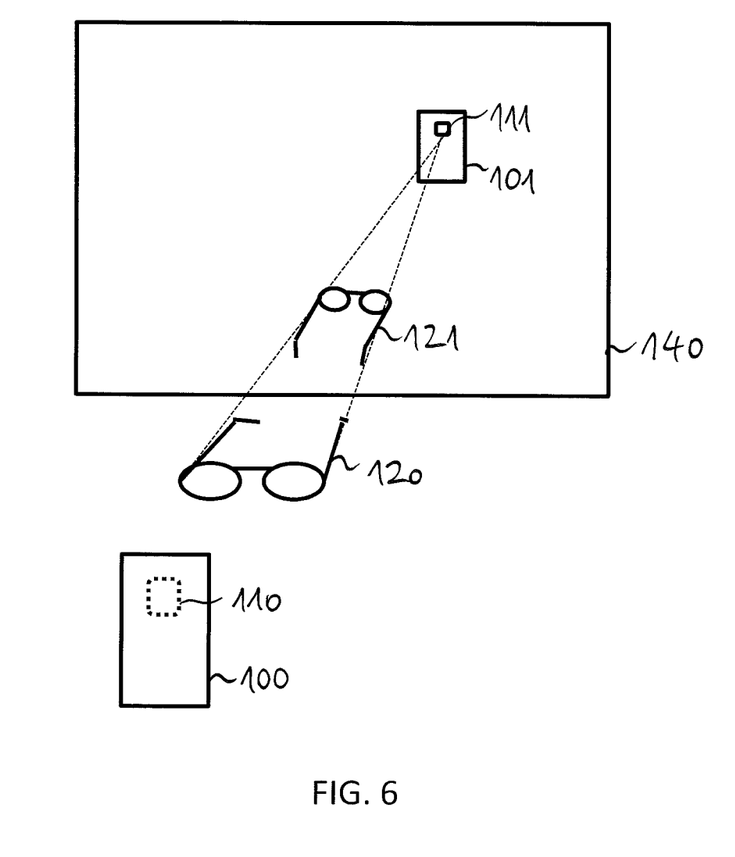
FIG. 6 schematically illustrates the camera-mirror setup according to a second aspect of the present invention.

According to the second aspect of the present invention, the calibration is based on the camera-mirror setup shown in FIG. 6. In this setup the camera 110 captures both of a normal view of the object 120 and a mirrored view 121 of the object 120. The mirrored view of the camera device 100 with its camera 110 (i.e. the mirrored camera device 101 with its mirrored camera 111) also appears in the mirror 140. In this case, the object 120 shall be within the field of view of the camera 110 at least partly.

It is noted that in FIG. 6, the camera device 100 has its camera 110 on its side facing the mirror 140 therefore the camera 110 is depicted by dotted line.

Figure 7:
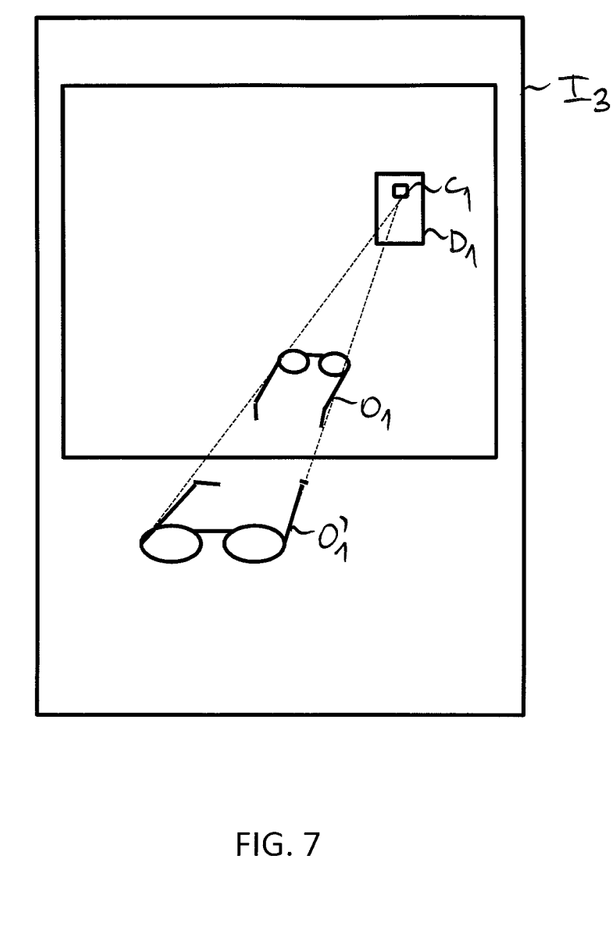
FIG. 7 shows an image captured by the camera in the camera-mirror setup of FIG. 6.

In FIG. 7, an image I3 captured in the camera-mirror setup of FIG. 6 is shown for example. In the image I3, the mirrored camera device has a pictures D1, the mirrored camera has a picture C1, and the normal view of the object and the mirrored view of the object have two pictures O1, O1', respectively, at different positions within the image I3.

Figure 8:
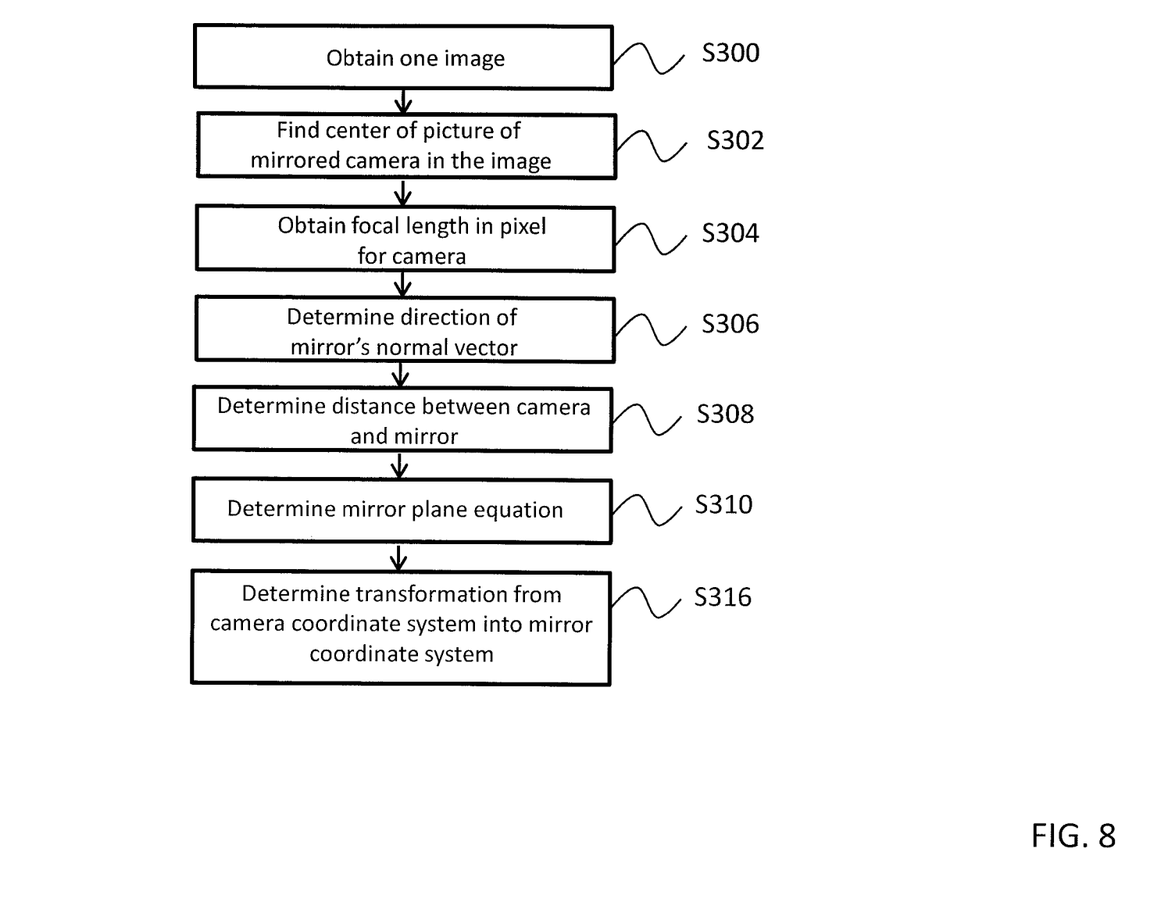
FIG. 8 is a flow diagram of the major steps of the calibration method according to the second aspect of the present invention.

The main steps of the calibration method of the present invention according to its second aspect is shown by the flow diagram of FIG. 8.

In step S300 one image is captured using the aforementioned camera-mirror setup as shown in FIG. 6. The captured image contains a picture of the mirrored view of the camera, as well as pictures of the normal view and the mirrored view of an object.

The image processing part of the method according to the second aspect of the present invention requires the only image processing phase of:
  A) Determining a coordinate transformation M* from the camera coordinate system $K_C$ to an arbitrary mirror coordinate system $K^*_M$ by using the image. The mirror coordinate system $K^*_M$ is selected so that its origo resides in the mirror's plane and its z-axis is parallel to a normal vector of the mirror's plane.

It is noted that in this aspect of the present invention, an arbitrary mirror coordinate system is enough for the calibration of the camera-mirror setup shown in FIG. 6 since only one image (i.e. image I3) is captured and consequently, it is not needed to determine a specific mirror coordinate system as a reference, which in the first aspect of the present invention was used to determine the coordinate transformations between the different camera coordinate systems, each belonging to a particular spatial image-capturing position.

The above phase A) of the image processing is carried out in the same way as in the first aspect, with the difference that only one coordinate transformation is determined between the camera coordinate system and the mirror coordinate system (which may have its origo anywhere in the mirror's plane and its up-vector extending in any direction within the mirror's plane). Accordingly, steps S302 to S310 correspond to steps S202 to S210 of the first method, respectively. In particular, in step S302, the center of the picture C1 of the mirrored camera is found in the image, then in step S304 the capturing focal length in pixels f/s of the camera is obtained, followed by determining the direction of the mirror's normal vector in step S306 and determining the distance between the mirror and the camera, i.e. the value of $\|m\|$ in step S308. As a result, the mirror plane equation is obtained in step S310 on the basis of the captured image.

In this case the center of the picture C1 of the mirrored camera is an epipole E of the stereo image system defined by the real and mirrored views of the object. Herein the term "epipole" is used to define the point where the epipolar lines meet. In projective geometry the epipole is the point where the lines that are parallel with the mirror's normal vector meet. This means that a line v that connects the epipole E with any point V1 of the picture O1 of the normal view of the object in the image I3 also contains the corresponding point V2 of the picture O2 of the mirrored object. By finding these points V1, V2 in the image I3, the position of the point in the real three dimensional space can be determined. In this regard it is assumed that the pixel coordinates of a point and the mirrored view of that point are both known, while only the distance between said point and the mirror is unknown. In this case there are two specific constraints, namely:

1. The distance between the point and the mirror's plane equals to the distance between the mirrored point and the mirror.
2. The vector that connects the real point and the mirrored point is perpendicular to the mirror's plane (and therefore it is also parallel to the normal vector of the mirror's plane).

From the above two conditions the distance between the real point and the mirror can be simply calculated as described below.

Let $(u_x, u_y)$ be the coordinates of the picture u of a real point p in a captured image and $(v_x, v_y)$ be the coordinates of the picture v of the mirrored view q of the point p within the same image. Once the distance c between the point p and the mirror is determined, the 3D coordinates of the real point p in the camera coordinate system can be easily calculated using the equations as described above.

Let $\mu_1$ and $\mu_2$ be selected in a way that $$p = \mu_1 \begin{pmatrix} u_x \\ u_y \\ H \end{pmatrix} = \mu_1 p_0 \text{ and } q = \mu_2 \begin{pmatrix} v_x \\ v_y \\ H \end{pmatrix} = \mu_2 q_0.$$

Clearly, $m^T p + d = c$ and $m^T q + d = -c$.
Hence, $$\mu_1 = \frac{c-d}{m^T p_0} \text{ and } \mu_2 = \frac{-c-d}{m^T q_0}.$$

Furthermore it is known that the differential vector p–q is parallel to the vector m, hence p–q=τm. Substituting $\mu_1$ and $\mu_2$ leads to a simple linear equation system for c and T. By solving the equation system, the 3D coordinates of the point p can be calculated.

Based on the above calculations and considerations, the coordinate transformation from the coordinate system of the image-capturing camera into an arbitrary mirror coordinate system having an origo in the mirror's plane and a z-axis parallel to a normal vector of the mirror's plane can be determined in step S316.

Upon calculating the positions of further associated point pairs in the image, the distances between these points in the real 3D space can be calculated.

The methods of the invention allow to determine real 3D coordinates of points which appear in any one of the at least one captured image. Thus the methods of the invention can be further used, for example, to measure the distance between two points of an object, which are visible in at least two different views in the at least one captured image. The different views of the object may include, for example, two different mirror views in two captured images, or a normal view and a mirrored view of the object within one image.

Accordingly, in a third aspect of the invention, it is provided a method of measuring a calibrated distance between two points of an object, wherein the method comprises the steps of:

capturing at least one image with multiple views of said object by means of a camera-mirror setup including at least one camera and a planar mirror, calibrating said camera-mirror setup through the steps of the method according to the first or second aspects of the invention, selecting an associated point pair of the object in one of the at least one captured image, and calculating the real distance between the two points of said selected point pair of the object from the corresponding image pixel pair by using epipolar geometry.

Once a stereo imaging system described above is calibrated by means of the above steps, a depth estimation for a captured object may be performed to generate a depth image of the object. Furthermore, once the stereo imaging system of the invention is calibrated through the above steps, the measurement of any kind of distances between two points becomes possible by finding associated point pairs in the at least one captured image.

Accordingly, in a fourth aspect of the invention, it is provided a method of calibrated depth estimation for an object, wherein the method comprises the steps of:

capturing at least one image with multiple views of said object by means of a camera-mirror setup including at least one camera and a planar mirror, calibrating said camera-mirror setup through the steps of the method of any one of the first or second aspects of the invention, and generating a depth image of the object from the at least one captured image.

In a fifth aspect, the present invention also relates to a computer program product, which includes computer-readable instructions that, when running on a computer, carry out the above steps of the method according to the first aspect of the present invention.

In a sixth aspect, the present invention also relates to a computer program product, which includes computer-readable instructions that, when running on a computer, carry out the above steps of the method according to the second aspect of the present invention.

What is claimed is:

1. A method for calibrating a stereo imaging system, the method comprising:
obtaining at least two images, each of the images being captured from a different camera position and comprising pictures of a mirrored view of at least one camera used to capture the respective image and a mirrored view of an object, thereby obtaining multiple views of said object;
finding a respective center of a picture of the mirrored view of the at least one camera in each of the images;
obtaining a focal length in pixels of the at least one camera;
determining a direction of a normal vector of a mirror from a center of the mirrored view of the at least one camera;
determining a distance between the at least one camera and the mirror for each of the images by using a reference point on the at least one camera, said reference point having known coordinates in a camera coordinate system, and using the coordinates of a corresponding point of the mirrored view of the at least one camera;
determining a mirror plane equation in the camera coordinate system by using a direction and a distance of a normal plane of the mirror and the focal length in pixels of the at least one camera;
defining an up-vector in the plane of the mirror;
selecting a reference point in the mirror's plane;
defining a reference coordinate system with said reference point as its origo and said up-vector as its vertical y-axis;
for each image, separately determining the coordinate transformation from the coordinate system of the at least one camera into a mirror coordinate system, for each image, determining the transformation from the respective mirror coordinate system into said reference coordinate system; and
for any pair of images, determining the coordinate transformation from a camera coordinate system of a first camera position into a camera coordinate system of a second camera position.

2. The method of claim 1, wherein the up-vector is obtained by projecting a gravity vector onto the plane of the mirror.

3. The method of claim 1, wherein the up-vector is obtained by selecting corresponding point pairs in the at least one image.

4. The method of claim 1, wherein the at least one camera is comprised in any one of a mobile phone, a smart phone, a phablet, a tablet computer, a notebook, a digital camera, or the like.

5. A method of measuring a calibrated distance between two points of an object, the method comprising:
calibrating said stereo imaging system according to claim 1;
selecting an associated point pair of an object in one of the images; and
calculating a real distance between the two points of said selected point pair of the object from the corresponding image pixel pair by using epipolar geometry.

6. A method of calibrated depth estimation for an object, the method comprising:
calibrating said stereo imaging system according to claims 1; and
generating a depth image of an object from the at least one captured image.

7. A method for calibrating a stereo imaging system, the method comprising:
obtaining an image, said image comprising a view of an object, a mirrored view of the object, and a mirrored view of at least one camera used to capture the image, thereby obtaining multiple views of the object;
finding a center of the mirrored view of the at least one camera in the image;
obtaining a focal length in pixels of the at least one camera;
determining a direction of a normal vector of the mirror from the center of the mirrored view of the at least one camera;
determining a distance between the at least one camera and the mirror for the image by using a reference point on the at least one camera, said reference point having known coordinates in a camera coordinate system, and using coordinates of a corresponding point of the mirrored view of the at least one camera;
determining a mirror plane equation in a coordinate system of the at least one camera by using the direction normal vector of the mirror, the distance between the at least one camera and the mirrors, and the focal length in pixels of the at least one camera; and
determining a coordinate transformation from the coordinate system of the at least one camera into an arbitrary mirror coordinate system having an origo in a plane of the mirror and a z-axis parallel to a normal vector of plane of the mirror.

8. The method of claim 7, wherein the at least one camera is comprised in any one of a mobile phone, a smart phone, a phablet, a tablet computer, a notebook, a digital camera, or the like.

9. A method of calibrated depth estimation for an object, the method comprising:
calibrating said stereo imaging system according to claims 7, and
generating a depth image of an object from the captured image.

10. A non-transitory memory, which includes computer-readable instructions that, when executed by a computer, cause the computer to:
obtain at least two images, each of the images being captured from a different camera position and comprising pictures of a mirrored view of at least one camera used to capture the respective image and a mirrored view of an object, thereby obtaining multiple views of said object;
find a respective center of a picture of the mirrored view of the at least one camera in each of the;
obtain a focal length in pixels of the at least one camera;
determine a direction of a normal vector of a mirror from a center of the mirrored view of the at least one camera;
determine a distance between the at least one camera and the mirror for each of the images by using a reference point on the at least one camera, said reference point having known coordinates in a camera coordinate system, and using the coordinates of a corresponding point of the mirrored view of the at least one camera;
determine a mirror plane equation in the camera coordinate system by using a direction and a distance of a normal plane of the mirror and the focal length in pixels of the at least one camera;
define an up-vector in the plane of the mirror;
select a reference point in the mirror's plane;

define a reference coordinate system with said reference point as its origo and said up-vector as its vertical y-axis;

for each image, separately determine the coordinate transformation from the coordinate system of the at least one camera into a mirror coordinate system for each image, determining the transformation from the respective mirror coordinate system into said reference coordinate system; and for any pair of images, determine the coordinate transformation from a camera coordinate system of a first camera position into a camera coordinate system of a second camera.

11. The non-transitory memory of claim 10, wherein the up-vector is obtained by projecting a gravity vector onto the plane of the mirror.

12. The non-transitory memory of claim 10, wherein the up-vector is obtained by selecting corresponding point pairs in the at least one image.

13. The non-transitory memory of claim 10, wherein the at least one camera is comprised in any one of a mobile phone, a smart phone, a phablet, a tablet computer, a notebook, a digital camera or the like.

14. The non-transitory memory of claim 10, wherein the computer-readable instructions further cause the computer to:

capture an image, the image comprising multiple views of an object; and generate a depth image of the object from the at least one captured image.

15. The non-transitory memory of claim 10, wherein the computer-readable instructions further cause the computer to:

capture an image, the image comprising multiple views of an object;

select an associated point pair of the object in the captured image; and calculate a real distance between two points of said selected point pair of the object from the corresponding image pixel pair by using epipolar geometry.

16. A non-transitory memory, which includes computer-readable instructions that, when executed by a computer, cause the computer to:

obtain an image, said image comprising a view of an object, a mirrored view of the object, and a mirrored view of at least one camera used to capture the image, thereby obtaining multiple views of the object;

find a center of the mirrored view of the at least one camera in the image;

obtain a focal length in pixels of the at least one camera;

determine a direction of a normal vector of the mirror from the center of the mirrored view of the at least one camera;

determine a distance between the at least one camera and the mirror for the image by using a reference point on the at least one camera, said reference point having known coordinates in a camera coordinate system, and using coordinates of a corresponding point of the mirrored view of the at least one camera;

determine a mirror plane equation in a coordinate system of the at least one camera by using the direction normal vector of the mirror, the distance between the at least one camera and the mirrors, and the focal length in pixels of the at least one camera; and determine a coordinate transformation from the coordinate system of the at least one camera into an arbitrary mirror coordinate system having an origo in a plane of the mirror and a z-axis parallel to a normal vector of plane of the mirror.

17. The non-transitory memory of claim 16, wherein the camera is any one of a mobile phone, a smart phone, a phablet, a tablet computer, a notebook, a digital camera or the like.

18. The non-transitory memory of claim 16, wherein the computer-readable instructions further cause the computer to:

capture an image, the image comprising multiple views of an object; and generate a depth image of the object from the at least one captured image.

19. The non-transitory memory of claim 16, wherein the computer-readable instructions further cause the computer to:

capture an image, the image comprising multiple views of an object;

select an associated point pair of the object in the captured image; and calculate a real distance between two points of said selected point pair of the object from the corresponding image pixel pair by using epipolar geometry.

20. The non-transitory memory of claim 16, wherein the reference point is the epipole of the image.

* * * * *